Figure 4:
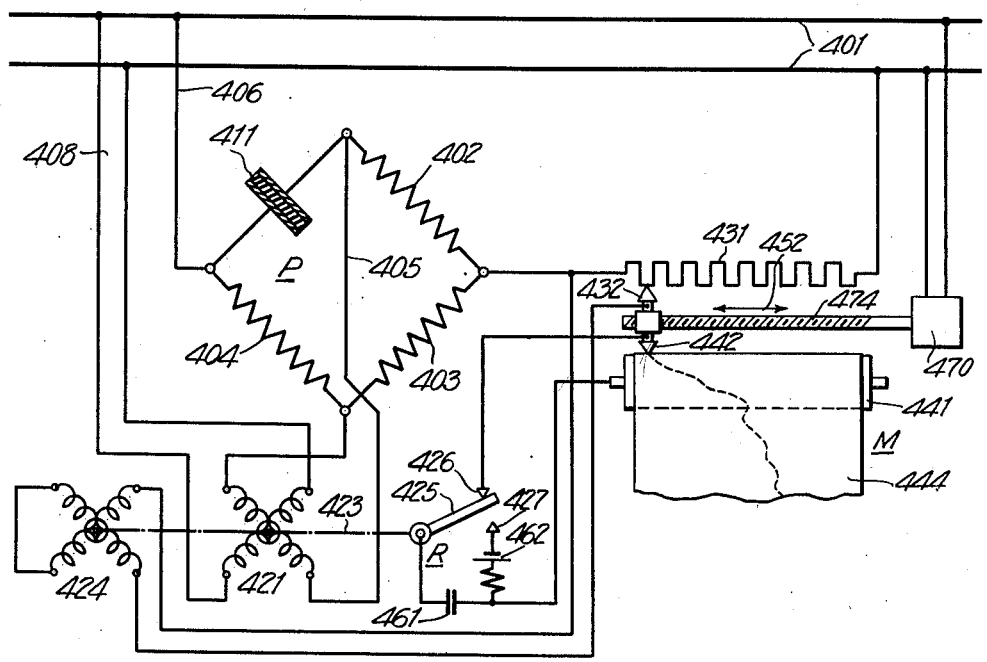

Feb. 8, 1944. G. KEINATH 2,340,880
DIFFERENTIAL MEASURING SYSTEM
Filed April 24, 1942 2 Sheets-Sheet 1
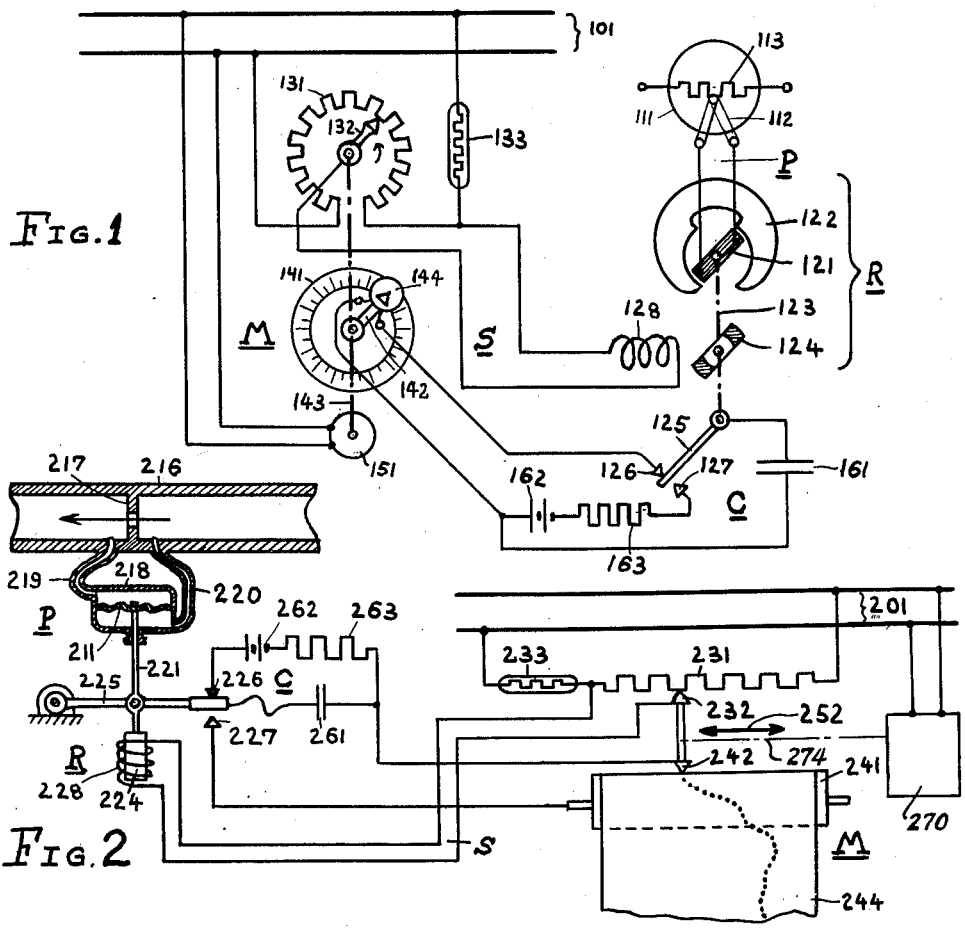
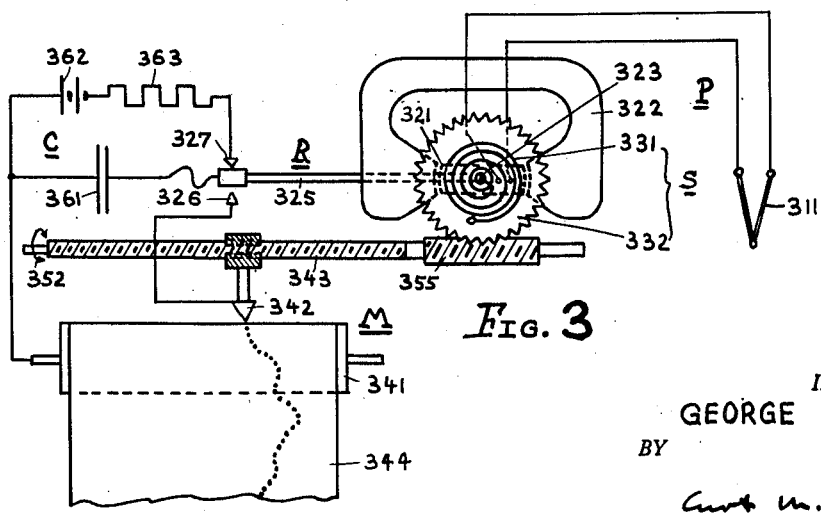
INVENTOR.
GEORGE KEINATH
BY Feb. 8, 1944.   G. KEINATH   2,340,880
DIFFERENTIAL MEASURING SYSTEM
Filed April 24, 1942   2 Sheets-Sheet 2

INVENTOR.
GEORGE KEINATH.
BY
Curtis M. Avery

Patented Feb. 8, 1944

2,340,880

UNITED STATES PATENT OFFICE 2,340,880

DIFFERENTIAL MEASURING SYSTEM

George Keinath, Larchmont, N. Y.

Application April 24, 1942, Serial No. 440,373

18 Claims. (Cl. 171—95)

My invention relates to electrical systems for measuring, indicating, recording or control purposes, and more particularly to apparatus in which a movable member, such as a pointer, recording stylus or control element, is to operate automatically in a given correlation to the variations of a primary measuring magnitude consisting of a voltage, current intensity, temperature, pressure, quantity or the like physical value.

It is known to provide such systems with a balanceable electric network having a zero instrument, variable circuit means for supplying the primary control magnitude, and an adjustable impedance member for compensating the effect of the variable circuit means on the zero instrument. A departure of the measuring magnitude from a given value causes the balance of the network to be disturbed so that the zero instrument deflects from its position of rest. As a result, the instrument, acting as a relay, controls drive means, which in turn control the adjustable impedance member of the network so as to reestablish the balance condition. When the network is balanced, a condition which the system tends to maintain automatically, the adjustment of the impedance member and of any indicating, recording, or control device coupled therewith, corresponds to the primary measuring magnitude.

The known systems of this type have some limitations which render them imperfect for many purposes:

First, the automatic control of the adjustable impedance is relatively sluggish. Customary recorders, for instance, require an adjusting period of about one or several seconds. This renders it impossible to use the system when fast-changing magnitudes are to be recorded. Secondly, the accuracy and reliability of the known systems are rather limited. This is partly also due to the relatively long time necessary for the automatic follow-up adjustments. Furthermore, many of the known systems of the type here in point are too complicated and sensitive for many purposes, and, when designed for one purpose, do not lend themselves readily for other purposes. For instance, some known systems operate for DC measurements only; others do not readily permit operations involving wattmetric measurements.

In my copending application Serial No. 384,489, filed March 21, 1941, an invention is described and claimed which eliminates one or several of the above-mentioned disadvantages and, among other things, permits reducing the operating time and increasing the accuracy of self-balancing electric systems. My present invention, in its general aspect, aims likewise at providing means for improving electrical systems over those of the prior art, but is also directed towards improving such systems so as to render them suitable and favorable for special requirements and uses as will be pointed out in the following.

An object of my present invention is to provide measuring systems for controlling a measuring mechanism for indicating, recording, or control purposes, which permit balancing or counteracting the primary measuring magnitude within the system by an opposing magnitude of a character diverse from that of the primary magnitude so as to facilitate using the system in cases where the primary magnitude and the auxiliary or opposing magnitude cannot easily be translated into electric current magnitudes of the same character or where such a translation of one or both magnitudes is apt to incur a complicated apparatus or a sluggish or faulty operation.

Another object is to design electric systems of the type here in point so as to permit or facilitate the application of an auxiliary counter-magnitude whose rate of change follows a law of progression (function) different from that of the primary or measuring magnitude.

Another line of objects involved in my invention is the following:

It is in many cases desired that the correlation between the primary magnitude and the effect caused thereby in the electrical apparatus be not straight-proportional but in accordance with a non-linear law. For instance, an indicating or recording instrument may be desirable whose scale of indication progresses in squares, square roots or logarithms of the magnitude to be measured. To mention a concrete example, the temperature increase in an electrical resistor varies in accordance with the square of the current intensity, so that an instrument for measuring the current intensity as a function of the temperature of the resistor effects an indication which progresses proportionally to the square of the current magnitude if the transmission, as customary, follows a linear-proportional law. In many cases of this type, it would be advantageous if the law of transmission, i. e. the relation between the magnitude actually measured and the instrumental effect caused thereby, were exponential so as to obtain a linearly progressing scale of indication. According to the prior art, a non-linear transmission, between a primary magnitude and a secondary or instrumental effect caused or controlled thereby, can be obtained by mechanical transmission means involving the use of intermediate cam mechanisms, or fly ball governors in association with electric circuits. These known devices are rather complicated, of low accuracy and limited applicability.

It is an object of my invention to provide means of simpler and more reliable design and operation for causing a physical magnitude supplied to an apparatus to produce or control an operation of the apparatus which progresses in a desired non-linear dependency on the variations of the magnitude.

Another object of the invention is to provide non-linear transmission means having the function just mentioned which lend themselves readily for various types of mechanical or electrical measuring mechanisms for indicating, recording or control purposes.

A further object consists in the provision of transmission means, especially for electric indicating, recording or control apparatus, which in type are capable of, and conveniently applicable for, performances according to various non-linear laws of transmission.

Other and more specific objects of the invention will become apparent from the following description of some of its essential features and from the embodiments referred to in a later portion of this specification.

My invention involves the use of an electrical measuring mechanism, such as an indicating, recording or control device, in which a movable structure is controlled by an electric pilot circuit which, in turn, is controlled by a relay or the like impulse-transmitting device, the latter being actuated in dependence upon the primary magnitude supplied to the apparatus and on the opposing magnitude of a variable auxiliary power. According to one aspect of my invention, the relay or transmitting device consists of a differential relay mechanism having one actuating member controlled by the primary magnitude and another actuating member controlled by the auxiliary power of variable magnitude which in turn is controlled in dependence upon the motion of the above-mentioned movable structure. Consequently, the actual compensation occurs within the mechanical portion of the relay mechanism and is reduced to a balance between two opposing torques as will be understood from the explanation given in a later place of this specification.

In another aspect of my invention, it is essential that the auxiliary power for compensating the effect of the primary magnitude on the relay or transmitting device vary according to a law of progression (function) different from that of the primary magnitude, so that the relay responds to a differential effect of the two differently progressing magnitudes. More particularly, the relay or impulse transmitter is designed for controlling the pilot circuit, and hence the movable structure of the apparatus, in dependence upon said differential effect assuming a pre-given value, preferably the zero or balance value.

Before discussing other aspects of the invention, it appears appropriate to elucidate the foregoing by describing an example embodying the above-mentioned features. To this end, reference is made to the drawings showing diagrammatically in Fig. 1 a system for measuring high-frequency currents, in Fig. 2 a system for measuring and recording fluid flow quantities, in Fig. 3 a temperature-recording system, in Fig. 4 a system for measuring a resistance, and in Fig. 5 a system for measuring wattmetric energy.

In all of these figures, the primary device or circuit for furnishing the magnitude to be measured or reacted upon is identified by P, the mechanism to be controlled in dependence upon the just-mentioned magnitude is denoted by M, the electric pilot circuit for actuating or controlling the mechanism by C, the relay means by R, while the means for cooperating with the primary magnitude in causing a differential effect to control the relay means is identified by S. This will facilitate comparing the different forms of the invention with one another and hence render the following description more easily understandable. For the same purpose, the last two digits of the reference numerals used in the different figures are identical whenever they refer to functionally similar elements.

Referring to Fig. 1, the embodiment illustrated represents an electric system for indicating a high-frequency current by means of a thermo-converter. A current source 101, for instance the utility line, A. C. or D. C., supplies the operating current. The thermo-converter is denoted by 111. It comprises a heating resistor 113 to be traversed by the high-frequency current to be measured, and a thermocouple 112 which is heated conductively by resistor 113 and connected with a moving coil 121 of a differential relay R. The permanent magnet system appertaining to coil 121 is denoted by 122. The axle carrying coil 121 is indicated by a dot-and-dash line 123. This axle is provided with a magnet armature 124 (unsaturated "moving iron") and a relay contact 125. The latter coacts with stationary contacts 126 and 127. An electromagnet 128 serves to actuate the armature 124. The current produced by the thermocouple 112 and supplied to coil 121 has the tendency to rotate axle 123 so as to move the movable contact 125 from contact 127 to contact 126. However, this tendency is counteracted by the electromagnet 128 acting on armature 124. Consequently, the switching-over movement of contact 125 depends on a differential effect, and more precisely on the occurrence of balance between the torques exerted by the two elements 121 and 124.

The magnet 128 is energized by a circuit S controlled by a potentiometric device having a resistor 131 and a rotary slide contact 132. The ends of the resistor 131 are connected with the current source in series arrangement with a stabilizing resistance tube 133 so as to be traversed by a constant current. One end of the resistor 131 is also connected with the magnet 128 whose other end is connected with the slide contact 132. Due to this connection, the energizing voltage of the magnet 128 varies between zero and a maximum during one complete rotation of the slide contact. During each such cycle, the torque on coil 124 varies over a range which includes the balance condition and hence causes the contact 125 to change its position with an effect to be explained in a later place.

The mechanism to be ultimately controlled is exemplified by an indicating device comprising a stationary scale 141 of linear graduation and a rotating arm 142 carrying a glow discharge lamp 144. The arm 142 and the slide contact 132 are rotated in synchronism with each other. This is indicated schematically by a connecting shaft (dot-and-dash line) 143 driven by synchronous motor 151 which is fed from the current source 101. The lamp 144 is connected with the relay contact 126 and with a condenser circuit comprising a condenser 161 connected to the movable relay contact 125 and a battery 162 connected with the relay contact 127 over a series resistor 163. In the contact position illustrated, the condenser 161 is charged from the battery 162. As soon as contact 125 switches over to contact 126, the condenser is discharged through the lamp causing it to flash.

The system operates as follows: The synchronous drive of the potentiometer and the indicator is caused to operate so as to effect a resistance variation during the measuring cycle. As a result, the energization of the magnet 128 passes continually through a magnitude at which the torque on armature 124 is equal to the torque on coil 121 produced by the voltage supplied by the thermoelement 111. The instant at which the balance occurs within each cycle of operation depends on the magnitude of the primary voltage at source P. That is, if this voltage is low, the slide contact will reach the point of the corresponding counter-voltage earlier than at a higher primary voltage. Consequently, the instantaneous position of the slide contact 132 at the occurrence of balance is in a given correlation to the voltage to be measured. The arm 142 moving synchronously, its instantaneous position relative to the scale 141 at the occurrence of balance is also indicative of the primary voltage, and since the relay contact 125 effects a sudden condenser discharge at the same moment, the flash of light produced in lamp 144 shows by its angular position the voltage value to be determined. The dependency on the primary voltage of the indications thus effected is not straight-proportional but follows a non-linear function and, more precisely, involves the extraction of the square root of the primary variations. This will be set forth presently.

The two actuating members 122, 121 and 128, 124 of the relay R are different as to their law of operation, i. e. the dependence of their control action, on the relay contact, upon their respective energization. The member 122, 121 follows a linear law, since the effect (torque $T_1$) produced by the moving coil is linear-proportional to the energizing voltage (or current) supplied thereto, while the law of operation of the other actuating member is non-linear since the effect (torque $T_2$) produced by the electromagnet 128 on its non-retentive and unsaturated armature 124 is proportional to the square of the energizing voltage (or current) supplied to magnet 128.

On the other hand, the output voltage of the primary circuit P, which varies with the square of the heating current, in resistor 113, to be measured and, hence, follows a non-linear (quadratic) law of progression, is supplied to the "linear" actuating member of the relay, while the voltage derived from the potentiometer and varying with a linear rate of change is supplied to the "non-linear" actuating member.

The balance conditions obtainable in such a system will be understood from the equations presented here below, in which the following symbols are used:

$T_1$=torque produced by coil 121,
$T_2$=torque produced by armature 124,
$I_x$=heating current in resistor 113,
$I_2$=energizing current in electromagnet 128,
$\alpha$=angular deflection of the indicator lamp 144 at the moment of a light flash,
$C_1$, $C_2$, $C_3$, and $C$ represent constants.

At the moment of balance, i. e. at the moment of a light flash, the torque ($T_1$) of coil 121 is equal to the countertorque ($T_2$) of armature 124. The torque $T_1$ is proportional to the voltage supplied by the thermoelement 111, and this voltage is proportional to the square of the heating current $I_x$:

$$T_1 = C_1 \cdot I_x^2$$

As previously explained, the torque produced by electromagnet 128 on armature 124 follows a quadratic function. Hence:

$$T_2 = C_2 \cdot I_2^2.$$

The energizing current in magnet 128 is substantially proportional to the angular position $\alpha$ of the slide contact 132, so that $$I_2 = C_3 \cdot \alpha$$

At the moment of balance:

$$T_1 = T_2$$

i. e.

$$C_1 \cdot I_x^2 = C_2 \cdot I_2^2$$

hence $$C_1 \cdot I_x^2 = C_3 \cdot \alpha^2$$

and $$\alpha = C \cdot I_x$$

In summary, the angular position of the slide contact, and hence the indication effected at the moment of balance, is proportional to the primary current (or voltage) magnitude. Consequently, the system according to Fig. 1 is a thermal ammeter which is distinguished by a linear or substantially linear scale, while ordinary thermal ammeters have in principle a quadratically graduated scale.

If the current $I_x$ is not of high frequency but a D. C. current and connected directly to coil 121, the same device can be applied for providing a recorder which, although its scale is not linear, has an increased initial sensitivity. In this case we have:

$$I_1 = C_1 \cdot T_x$$
$$I_2 = C_2 \cdot T_2^2 = C_3 \cdot \alpha^2$$

so that $$\alpha = C \cdot \sqrt{T_x}$$

The impotrance of this transmission system will be realized from a simple numerical example:

If the maximum current I to be recorded be assumed as 100% and the corresponding angular deflection $\alpha$ of the recorder also as 100%, the following approximate relations exist:

At $I=100$, $\alpha=100$
At $I= 50$, $\alpha= 70$
At $I= 10$, $\alpha= 31$
At $I=  5$, $\alpha= 22$
At $I= .1$, $\alpha=  3$
At $I= .01$, $\alpha=  1$ Consequently, the sensitivity of the system at $I=.01$ is one hundred times as great as with a current $I=100$. This means that due to the invention, a large measuring range can be covered while at the same time the operation has an increased sensitivity and accuracy at low measuring magnitudes. In this respect, the invention represents a considerable advantage over the known indicators and recorders with a linear scale for current, as used especially for resistance and insulation recorders. The initial sensitivity of such instruments surpasses even the sensitivity of ratio instruments (megohm-meters with two and three moving coils), and the new instruments have the important advantage that the scale law is determined not by the position of moving coils in air gaps of very different lengths along the path of the moving coil, but only by a definite and simple law, so that the scale can be printed and requires no manual point-by-point calibration.

Obviously, the invention is not limited to the use exemplified by Fig. 1, and the mechanism M to be actuated may be of other than indicating type. For instance, in a system otherwise designed according to Fig. 1, the control impulse effected by circuit C may serve to produce a permanent record or actuate a mechanism for controlling an electric motor, furnace or any other machinery or apparatus to be operated in dependence upon the changes of a variable primary measuring magnitude. In this respect, reference is made to my above-mentioned copending application Serial No. 384,489, showing, for instance in Fig. 6, a furnace-controlling system which is also applicable in connection with the differential system according to the present invention. As a matter of fact, the present invention, in some of its aspects, involves a continuation-in-part and further development of my just-mentioned copending case.

It should also be noted that, while Fig. 1 shows an automatic operation obtained with the aid of a synchronous motor 151, the system can also be operated with a manual actuation of the simultaneously moving potentiometer and indicator elements, and may be provided with other indicating devices than the rotating neon lamp shown in Fig. 1. For instance, in a hand-operated device, otherwise constructed like the system shown in the figure, an ammeter may be inserted in the circuit feeding the potentiometer resistance 131, and the control circuit C may be connected with the moving coil of the ammeter instead of with a glow lamp in order to short-circuit the ammeter at the moment of balance. The pointer of the ammeter drops to zero as soon as the system passes through the balance condition. In this way, the ammeter, usually needed for indicating the constant supply current, serves at the same time as a balance indicator.

Reverting once more to Fig. 1, it will be seen that in the illustrated embodiment, both the primary magnitude and the counter-magnitude are of electrical nature and produce a differential effect on the relay contact by producing each a torque with magnetical means. In other aspects of the present invention, either of the two differentiated magnitudes of different laws of progression may also be produced by other than electrical means, and may act on the relay by other than magnetical devices. To elucidate these other possibilities, reference is made to the examples shown in Figs. 2 and 3 of the drawings.

Fig. 2 shows a system according to the invention, in which the means P for producing the primary magnitude and for causing it to act on the relay are non-electrical. The magnitude to be measured is the rate of flow of a fluid, for instance steam, through a pipe 216. The fluid passes through an orifice plate 217 causing different pressures to prevail at both sides of the orifice. The pressure difference is dependent upon the rate of flow. This difference is caused to act on a manometric device exemplified by a casing 218 containing a membrane 211 and connected with the appropriate locations of pipe 216 by means of conduits 219 and 220 respectively. The membrane 211 is connected with a movable relay contact 225 by means of a rod 221. The contact 225 is provided with an armature of soft iron acted upon by a solenoid 228. Hence, the relay R responds to a differential effect and, by means of stationary contacts 226 and 227, causes a condenser 261 to be charged from a battery circuit 262, 263 during the periods of unbalance and to be discharged at the moments of balance.

The solenoid 228 is energized from a potentiometer having its resistor 231 arranged in a constant-current circuit and its slide contact 232 moved periodically in synchronism with the stylus electrode 242 of a recorder M. The recorder has a drum 241, driven by a synchronous motor or a clockwork in proportion to time, the drive mechanism not being illustrated, while the stylus electrode 242 is reciprocated rectilinearly in the direction of the arrow 252 by means of a motoric drive 270 and a suitable transmission represented schematically by a dot-and-dash line 274. The stylus electrode 242 and the slide contact 232 are connected with each other and actuated to move in synchronism. The apparatus indicates automatically the rate of fluid flow over time on a recording tape 244.

Since the pressure acting on the membrane 211 and through the connecting rod 221 on the relay contact 225 is proportional to the square of the rate of flow, and the magnetic counter-force is also a square function of the periodically varying current supplied by the potentiometer, the system has the effect of extracting the square root for the same reasons as explained in connection with Fig. 1.

The system shown in Fig. 3 is representative of those types of apparatus according to the invention wherein the means P for conveying the primary magnitude to the relay are electric and electromagnetic, while the counter force to produce the above-described differential effect is supplied by mechanical means. The system is similar to that of Fig. 1 in having a variable current source 311 connected, if necessary through an amplifier, with the moving coil 321 of a relay. The coil 321 is mounted on an axle 323 carrying a movable contact arm 325. 322 is the magnetic system of the relay instrument R. The movable contact 325 cooperates with stationary contacts 326 and 327, and controls a branched control circuit 361, 362, 363 connected with the drum 341 and the stylus electrode 342 of a recorder M for producing a record on a tape 344 passed over the drum.

A spiral spring 331 is at one end attached to the axle 323 and at its other end to a gear disk 332 meshing with a worm thread 355 of a drive shaft 343. The stylus electrode 342 is mounted on a nut 353 which engages another threaded portion of the shaft 343.

When in operation, the shaft 343 is periodically rotated by suitable drive means, not illustrated, in alternate directions, as indicated by the arrow 352, so as to reciprocate the stylus 342 along the drum surface. At the same time, the gear disk 332 is rotated back and forth in synchronism with the stylus. As a result, the tension of the spring 331 is varied between a positive and a negative value, each instantaneous magnitude of the torque exerted on the relay shaft conforming to the instantaneous position of the stylus along its path of movement. The scope of variation of the tension is so chosen as to be capable of establishing the balance of the relay throughout the desired measuring range. The variation in torque caused by the spring on the movable relay system is proportional to the angle $\alpha$ of deflection of the disk 332. Consequently, the spring mechanism operates as a mechanical equivalent of a potentiometric device of usual design, and the system effects a recording proportional to the primary magnitude (voltage or current of source 311) to be determined. This method is to be applied especially for recording amperes, volts, watts, D. C. and A. C.

A spring mechanism of the type just-described does not require a constant current supply and, for certain cases of application, has also advantages as to space requirements. If the spring is properly designed, its torque varies in a perfectly linear proportion to the angular displacement of one end of the spring and has a high degree of accuracy remaining unchanged for a very long period of time. However, it is not necessary that the spring have a linear characteristic. Any other given relation between the torque and the displacement of the end of the spring may be suitable, depending upon the particular circumstances.

The necessity of providing a constant current source, as used in the devices according to Figs. 1 and 2, can be eliminated in systems whose counter energy is produced electrically. To this end, the circuits for energizing the two actuating means of the differential relay can be connected with each other so that a disturbing current or voltage variation in the current supply influences both actuating means, thereby effecting a compensation. This aspect of the invention will be elucidated in connection with the example illustrated in Fig. 4.

In Fig. 4, 441 denotes the drum and 442 the stylus of a recorder M for writing a curve on a recording tape 444. The drum is rotated with constant speed by customary drive means, for instance a clockwork (not illustrated). The system shown represents an ohmmeter for determining the electric resistance variations of a test object 411. The test object is connected with resistors 402, 403 and 404 in a bridge circuit P fed through leads 406 and 407 from a current source 401 in series connection with a potentiometer resistor 431 having a slide contact 432. The slide contact is connected with the stylus 442 of the ink recorder to move in synchronism therewith. A motor 470 fed from the current source 401 through leads 409 serves to actuate the slide contact 432 and the ink stylus 442 by means of a worm shaft so as to effect a reciprocatory synchronous movement of slide contact and stylus as indicated by the arrow 452. In this respect, the arrangement is similar to the drive means shown in Fig. 2.

In order to control the recorder in dependence upon the resistance magnitude to be measured, a relay device R is provided, comprising a movable relay contact 425, two lever stationary contacts 426 and 427, and a control circuit which contains a current source 462 and a capacitor 461 connected between the relay contacts and the drum and stylus of the recorder, similar to the examples described previously.

The actuating element 421 of the differential relay is a wattmetric zero instrument and has one of its coils connected by leads 408 with the current source 401, while the other coil lies in the diagonal branch of the bridge circuit. The actuating device 424 is of the $C \cdot I^2$ type and consists, for instance, of an electrodynamic moving coil instrument having its coils connected between the slide contact 432 and one end of the resistor 431 so as to be energized by the voltage taken from the potentiometer. This voltage depends on the position of the slide contact 432 and hence also on that of the stylus 442. The two actuating devices 421 and 424 oppose each other so that the movable arm 425 responds to a differential effect.

The recording operation is similar to that of the previous embodiments and involves the extraction of a square root as explained in connection with Fig. 1. It will also be seen that the operation is independent of current or voltage fluctuations of the current source 401 because such fluctuations act on both the zero instrument of the bridge and the potentiometrically energized actuating device, and thus are compensated as to their effect on the relay.

Figure 5:
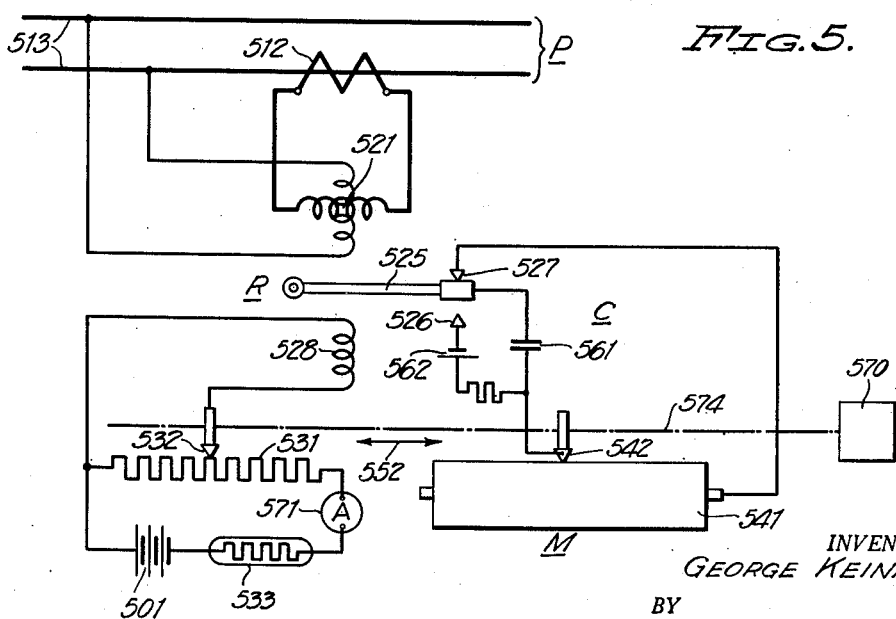

Fig. 5 represents a system operating in response to variations of wattmetric energy. The relay R for controlling the control circuit C has a movable member 525 cooperating with stationary contacts 526 and 527, and comprises two opposing actuating members formed by a magnet coil 528 and a set 521 of wattmetric coils. One of the wattmetric coils is energized in accordance with the voltage of the current source 513, and the other is connected to a current transformer 512 to be energized in accordance with the current of the source 513. Coil 528 is connected with the movable contact 532 of a potentiometer whose resistor 531 is fed by constant current from an auxiliary source 501 through an automatic current-regulating device 533 and an ammeter 571. The mechanism M to be operated is represented by a recorder having a transport drum 541 and a stylus 542. A motoric driving device 570 is connected with both the stylus 542 and the movable potentiometer contact 532, so that, when in operation, the contact 532 is reciprocated in synchronism with the movable member of the mechanism controlled by the circuit C, this circuit being exemplified by a discharge arrangement containing a current source 562 and a capacitor 561. The law of transmission in this system is strictly linear, and the recorder does not need individual calibration as long as the potentiometer 531 has a linear characteristic.

The above-described embodiments of my invention have in common that a variable control magnitude is balanced by an opposing, independently varying magnitude by supplying both to a differential relay and translating them, within the relay mechanism, into torques acting in opposition on the same movable relay member which, in turn, governs the operation of a mechanism to be actuated, this mechanism having its operating member moved in synchronism and in a given relation to the variation of the opposing magnitude, i. e. also independently of the variations of the control magnitude to be primarily reacted upon.

A differential relay system of this type affords a number of advantages and improvements over the known systems. It lends itself readily to constructions of high accuracy due to the fact that the angular deflection of the relay is small, hence the magnetic air gaps virtually constant, and the magnetic fields highly concentrated so that the torques are exactly proportional to the energizing magnitudes. Differential relay systems according to my invention and as shown in the foregoing have the further advantage that they are easily applicable for measuring magnitudes of various physical nature and in a large number of different fields of application.

As also shown in the foregoing, it is a further advantage of differential relay systems according to my invention to obtain a desired, linear or non-linear, law of transmission in order to render the indicating scale of the apparatus in accordance with a desired scale graduation. According to Figs. 1, 2 and 4, it is possible to effect an indication, recording or control in proportion to the square root of the primary magnitude by combining in the differential relay an actuating member of linear action (i. e. whose torque is in linear proportion to the energizing magnitude) with another actuating member of quadratic action (i. e. whose torque is proportional to the square of the energizing magnitude).

Quadratic actions applicable in systems of the just-mentioned type are, inter alia, the magnetic attraction in a non-saturated magnetic armature or "moving iron" (such as 124 in Fig. 1 or 224 in Fig. 2), the force or torque in an electrodynamic system having a stationary and a movable coil connected in series (such as 424 in Fig. 4), thermal effects in a resistor caused by an electric current, effects caused by an inductance member in the branch of a bridge circuit in dependence upon the electric current. Any such counteraction following a quadratic function is suitable in principle, and the basic idea of my desquaring devices is to impress a separately controlled and linearly progressing energization on such a quadratic action of a differential relay arrangement, while the action on the differential arrangement caused by the primary magnitude is of linear type.

It is also within the objects of my invention to provide electric systems of the general type here in point whose law of transmission is not the extraction of the square root but represents another non-linear function. When describing the illustrated embodiments, it has been assumed in the foregoing that the counter magnitude, for instance, the voltage and current supplied from the potentiometer 131, 132 in Fig. 1, progresses linearly. One way of changing the law of transmission consists in providing a non-linear progression of this counter magnitude. For instance, if the potentiometer resistor 131 is so graduated as to furnish a quadratically increasing voltage through the moving contact 131 to the relay coil 128, the system no longer extracts the square root of the primary magnitude but produces an effect proportional to the fourth root.

Systems involving the extraction of the fourth root are of advantage, for instance, in pyrometric measuring apparatus for determining the temperature of a source of radiating heat which increases with the fourth power of the absolute temperature of the heat source.

Referring again to Fig. 1, for instance, it will now be clear that the gradation of the resistor 131 can be so chosen as to follow another suitable function and that thereby a variety of non-linear operations, i. e., not necessarily the extraction of the square root or fourth root, is obtained. Similarly, if the action of the non-linear member of the relay arrangement (see 128, 124 in Fig. 1, for instance) is not quadratic but follows another non-linear law, the total effect is again a different non-linear transmission. In consequence, the invention affords a virtually unlimited number of non-linear transmission possibilities by having the primary magnitude and a variable and separately controlled counter magnitude of different rate of change act on an electric relay arrangement by means of differentially acting members of which at least one is of suitable non-linear function.

The control circuit of the illustrated systems is of a construction especially favorable in cases where a high speed and high accuracy of operation are desired. This circuit contains a condenser which is charged during relatively long periods and suddenly discharged in the moment when the differential relay passes through its balance condition. A very short movement of the movable relay contact is required to discharge the stored energy into the control circuit. As a result, the control operation is substantially instantaneous and occurs without appreciable phase difference between the actual moment of balance and the control effect produced. Such a condenser discharge circuit can be used for recording purposes by employing electrolytic recording tape or using a spark discharge between the stylus and the transport drum for puncturing the recording tape.

I claim:

1. An electric measuring system for causing a variable measuring magnitude to control the operation of a measuring mechanism in accordance with a non-linear dependency, comprising a relay having electric contact means connected with said mechanism and differential means for controlling said contact means, said differential control means comprising two separately energized actuating members arranged to act in opposition to each other and having respectively a linear and non-linear law of operation as regards the dependence of their control action on said contact means upon their respective energization, energizing means responsive to said measuring magnitude and connected with one of said members for causing it to vary its action in accordance with said measuring magnitude, an energy source connected with said other member, and cyclically operating drive means connected with said source for varying the energy supplied by said source to said other member over a given range independently of said control magnitude, whereby said relay is controlled to operate said mechanism in response to the differential effect of said linearly progressing action and said non-linearly progressing action.

2. An electric system for controlling a movable structure of a measuring mechanism in a non-linear dependency upon a variable measuring magnitude, comprising a relay having electric contact means connected with said movable structure and differential actuating means for controlling said contact means, said differential actuating means comprising an electrically operated actuating member and a second actuating member arranged to produce opposing torques, one of said actuating members having a linear law of operation and the other member a non-linear law of operation as regards the dependency of its action upon its energization, circuit means connected with said electrical member for energizing it in accordance with said measuring magnitude, energizing means connected with said other member and having a movable element for varying the energization of said other member, and drive means for moving said movable structure and said movable element in synchronism with each other, whereby said relay renders said movable structure member effective to perform a measuring function in a position where said linear and non-linear actions of said actuating members are balanced.

3. An electric measuring system for controlling a measuring mechanism in a non-linear dependency on a variable measuring magnitude, comprising a relay having electric contact means and two actuating members arranged to act in opposition on said contact means to control said contact means in response to a differential effect, one of said actuating members having a linear action and the other a non-linear action as regards the dependence of said action on the energization of the respective members, energizing means connected with one of said members for energizing it in dependence upon said measuring magnitude, a compensating circuit forming a source of electric current and being connected with said other actuating member for energizing the latter by said current, said circuit including variable circuit means for varying said current, said mechanism having a movable structure connected with said variable circuit means of said compensating circuit so as to maintain a given relation of its position to the variation of said current, drive means for actuating said variable circuit means and said structure in a given cycle independent of the variations of said measuring magnitude, and a pilot circuit connecting said contact means with said movable structure of said mechanism whereby said relay renders said structure electrically effective in dependence upon the differential effect of said linear action and said non-linear action having a given magnitude.

4. An electric measuring system for controlling the operation of a measuring mechanism in dependence upon a variable measuring magnitude, comprising an electro-mechanical relay having a movable relay member and two differentially operating actuating devices, one of said devices having mechanical energizing means and the other having electrical energizing means, control means subject to said measuring magnitude and connected with one of said energizing means for controlling the latter in dependence upon said magnitude, an energy source connected with said other energizing means, periodically operating adjusting means connected with said energy source for varying the energization of the appertaining energizing and actuating means over a given range and independently of said measuring magnitude, said mechanism having a movable structure and drive means for moving said structure in synchronism with said periodically operating adjusting means, and a pilot circuit under control of said movable relay member and connected with said mechanism for rendering said structure electrically effective to perform a measuring function at a point of its travel where the corresponding adjustment of said adjusting means causes said movable relay member to respond to a given differential effect of said actuating devices.

5. An electric measuring system for controlling the operation of a measuring mechanism in a non-linear dependency upon a variable measuring magnitude, comprising an electric relay having a movable relay member and two actuating members disposed to act differentially on said movable member, one of said actuating members having a linear dependency and said other actuating member a non-linear dependency of its action on its energization, an electric circuit connected with said member of linear dependency for energizing it in accordance with said measuring magnitude, another circuit connected with said member of non-linear dependency and comprising potentiometric means for varying the energization of said latter member, said mechanism to be controlled having a movable structure coupled with said potentiometric means to move in a given relation to said potentiometric variation, and electric circuit means connected between said movable relay member and said structure and controlled by said movable relay member for rendering said structure operative in a position where said movable relay member responds to the balance condition of the actions of said two actuating relay members, said two electric circuits connected with said actuating relay members being associated with each other to form a network and having a common current source connected with said network to energize said two circuits in a fixed ratio in order to prevent disturbing effects of current fluctuations of said source on the operation of the mechanism.

6. An electric measuring system for controlling the operation of a measuring mechanism in dependence upon a variable measuring magnitude, comprising an electric relay having a movable relay member and two actuating members disposed to act differentially on said movable member, an electric circuit connected with one of said members for energizing it in accordance with said measuring magnitude, another circuit connected with said other member and comprising potentiometric means for varying the energization of said latter member, said mechanism to be controlled having a movable structure coupled with said potentiometric means to move in a given relation to said potentiometric variation, and electric circuit means connected between said movable relay member and said structure and controlled by said movable relay member for rendering said structure operative in a position where said movable relay member responds to a given value of the differential effect of said actions of said actuating members, said two circuits connected with said actuating members being also connected with each other and having a common current source so as to be equally affected by current fluctuations of said source in order to render such fluctuations ineffective as regards said differential effect.

7. An electric system for controlling a measuring mechanism in dependence upon a variable measuring magnitude, comprising a differential relay having a movable relay member and two actuating members for producing each a torque on said relay member in opposition to the torque produced by said other actuating member, control means responsive to said measuring magnitude and connected with one of said actuating members so as to cause it to vary its torque in accordance with said measuring magnitude, energizing means connected with said other actuating member for supplying an opposing magnitude to said other actuating member to cause the latter to vary its torque in accordance with said opposing magnitude, drive means operatively connected with said energizing means for varying said opposing magnitude over a given range independently of the variation of said measuring magnitude, said mechanism having a movable structure connected with said drive means so as to move in synchronism with and in a given relation to said variations of said opposing magnitude, and a pilot circuit under control by said relay member so as to be operative at the moment when the differential effect of said two torques on said relay member has a predetermined value, said control circuit having a current source connected with said movable structure through said relay member to render said structure operative at said moment, whereby said mechanism is caused to operate in accordance with said measuring magnitude.

8. An electric system for controlling a movable structure of a measuring mechanism, comprising a differential relay having a movable relay member and two actuating members for producing each a torque on said relay member in opposition to the torque produced by said other actuating member, energizing means for supplying an electric magnitude to one of said actuating members so as to control the latter to produce its torque in accordance with said electric magnitude, further energizing means for supplying another control magnitude to said other actuating member to cause it to produce its torque in accordance with said other magnitude, cyclically operating drive means connected with one of said energizing means and also with said movable structure for varying said magnitude supplied by said latter energizing means in synchronism with and in a given relation to the motion of said structure independently of said other magnitude, and a pilot circuit having a current source connected with said mechanism under control of said relay member for electrically energizing said movable structure so as to cause it to perform a measuring function at the moment of balance between said torques, whereby the operation of said movable structure is indicative of the time point when said magnitude varied by said drive means has a given relation to said other magnitude.

9. An electric system for causing a measuring mechanism to operate in dependence upon a variable electric measuring magnitude, comprising a circuit for supplying said variable electrical measuring magnitude, a compensating circuit having a current source and a movable circuit member for varying the current in the latter circuit, a relay having two elements connected in said two circuits respectively, whereby said relay is subject to both said measuring magnitude and the effect of said compensating circuit adjusted by said movable circuit member, drive means for periodically varying the adjustment of said circuit member over a range including the adjustment where the effect of said measuring magnitude on said relay is balanced, said measuring mechanism having a movable structure operated periodically in a given relation to the periodic adjustment of said circuit member, and a third circuit having a current source controlled by said relay and connected with said movable structure whereby said movable member is energized at the point of its periodic travel where said relay is balanced.

10. An electric measuring system comprising an AC circuit furnishing a variable electric measuring magnitude, a relay having a wattmetric actuating device, a relay winding and a relay mechanism controlled by said device and said winding so as to be responsive to the condition of balance between the control effects of said device and said winding, said wattmetric actuating device being connected with said circuit to respond to said measuring magnitude, a compensating circuit having a substantially constant current source and an adjustable impedance member connected with said winding for energizing said winding by current supplied by said source and controlled by said impedance member, drive means connected with said impedance member for periodically varying the adjustment of said impedance member over a range including the adjustment where said balance condition is obtained, a measuring mechanism to be controlled in accordance with said measuring magnitude, said measuring mechanism having a movable structure operated periodically in a given relation to the periodic adjustment of said impedance member, and a third circuit having an energy source controlled by said relay mechanism and connected with said movable structure for energizing said structure at the point of its periodic travel where said relay mechanism is balanced, whereby said structure performs a measuring function indicative of said measuring magnitude.

11. An electric measuring system for causing a variable magnitude to control the operation of a measuring mechanism in accordance with a non-linear dependency, comprising electric circuit means for producing an electric energization corresponding to said measuring magnitude, a compensating circuit forming a source of electric current and having a movable circuit member for varying said current, a relay having two actuating members connected with said circuit means and said compensating circuit, respectively, to actuate the relay in response to a differential effect controlled by said magnitude and said current, one of said actuating members having a linear action and the other a non-linear action as regards the dependence of their action upon their respective energization, said measuring mechanism having a movable structure, drive means for moving said movable circuit member of said compensating circuit and said structure periodically in a given relation to each other and over a range of motion which includes the position of said movable circuit member where said differential effect has a given magnitude, and a pilot circuit having a current source controlled by said relay and connected with said movable structure to render the latter electrically operative at a point of its periodic travel where said relay responds to said given differential magnitude, whereby the electrically controlled operation of said structure is indicative of said measuring magnitude.

12. An electric measuring system for controlling the operation of a measuring mechanism in dependence upon a variable physical magnitude, comprising a relay having a movable relay member, actuating means for effecting a variable control action on said relay member in accordance with said variable physical magnitude, and mechanical means for effecting a counteraction on said movable member in order to have the latter respond to a given magnitude of the differential effect of said two actions, said mechanical means comprising a spring connected with said movable relay member and a device for varying the action of said spring on said movable relay member, said measuring mechanism having a movable structure connected with said device so as to move in a given relation to the variation of said counteraction effected by said device, and a pilot circuit having a current source connected with said structure under control of said relay for energizing said movable structure when said movable relay member responds to said differential effect, whereby the electric operation of said structure is indicative of said physical magnitude.

13. An electric measuring system for controlling the operation of a measuring mechanism in dependence upon a variable physical magnitude, comprising a relay having a movable relay member, actuating means for effecting a variable control action on said relay member in accordance with said physical magnitude, and mechanical means for effecting a counteraction on said movable member in order to have the latter respond to a given magnitude of the differential effect of said two actions, a device associated with said mechanical means for periodically varying said counteraction over a given range and independently of said physical magnitude, said measuring mechanism having a movable structure connected with said device so as to move in synchronism therewith, and a pilot circuit disposed between said movable relay member and said movable structure to energize the latter electrically at a point of its periodic travel where said movable relay member responds to said given differential magnitude, whereby said structure is caused to perform a function indicative of said physical magnitude.

14. An electric measuring system for controlling the operation of a measuring mechanism in a non-linear dependency upon a variable measuring magnitude, comprising a relay having a movable member and two actuating members disposed to act differentially on said movable member, one of said actuating members having a linear dependency of its action on its energization, said other actuating member having a quadratic dependency of its action on its energization, means for energizing said actuating member of linear dependency in accordance with said measuring magnitude, an auxiliary energy source for energizing said actuating member of quadratic dependency, a regulating device disposed between said energy source and said latter actuating member and having a movable part for varying the energization of said latter actuating member in linear dependency on the motion of said part, said measuring mechanism having a movable structure, drive means for actuating said movable parts and said movable structure periodically and in synchronism with each other, and a pilot circuit having a current source under control of said movable relay member and connected with said movable structure to energize said structure at a point of its periodic travel where said movable relay member responds to the balance between said linear and quadratic actions of said actuating members, whereby said structure performs a function indicative of said measuring magnitude.

15. An electric measuring system for controlling the operation of a measuring mechanism in a non-linear dependency upon a variable measuring magnitude, comprising a relay having a movable member and two actuating members disposed to act differentially on said movable member, one of said actuating members having a linear dependency of its action on its energization, said other actuating member having a quadratic dependency of its action on its energization, means for energizing said actuating member of linear dependency in accordance with said measuring magnitude, a current source for supplying energizing current to said actuating member of quadratic dependency, a potentiometer arranged between said current source and said latter actuating member and having a movable part for varying said current in linear dependency on the motion of said part, said measuring mechanism having a movable structure coupled with said movable potentiometer part to move in a given relation to said part, drive means for actuating said movable part and said movable structure in a given cycle and in synchronism with each other independently of said measuring magnitude, and a pilot circuit having an electric energy source connected with said structure and controlled by said movable relay member for rendering said structure electrically operative in a position where said movable relay member responds to the balance between the actions of said two actuating relay members.

16. An electric system for controlling a measuring mechanism in dependence upon a variable measuring magnitude, comprising a differential relay having a movable relay member and two actuating members for producing each a torque on said relay member in opposition to the torque produced by said other actuating member, said movable member having a limited path of motion between two end positions so as to perform a switching-over movement upon a change in the direction of the resultant effect of said opposing torques, an electric contact assembly having two contacts associated with said movable relay member to be operative in said two end positions respectively of said movable relay member, said mechanism having electric indicating means connected with said drive means so as to move in synchronism with and in a given relation to said variations of said opposing magnitude, and a pilot circuit having a current source and an energy storage element connected with said contact assembly and said movable indicating means so that said storage element is charged from said source when said movable relay member is in one of said end positions and discharged through said indicating means when said movable relay member is in said other end position, whereby said indicating means is caused to effect an indication in a position of its travel representative of said measuring magnitude.

17. A system for recording a variable magnitude to be measured, comprising a differential relay having a movable relay member and two actuating members for producing each a torque on said relay member in opposition to the torque produced by said other actuating member, said movable member having a limited path of motion between two end positions so as to perform a switching-over movement upon a change in the direction of the resultant effect of said opposing torques, an electric contact assembly having two contacts associated with said movable relay member to be operative in said two end positions respectively of said movable relay member, a recording device having a rotatable member for transporting a recording chart and a stylus member movable relative to said rotatable member for producing recording marks on the chart, means for actuating said rotating member in accordance with a control magnitude, drive means connected with said stylus member for actuating it in synchronism with said variations of said opposing magnitude, and a pilot circuit having a current source and an energy storage element connected with said contact assembly and said recording device so that said storage element is charged from said source when said movable relay member is in one of said end positions and discharged through said recording device when said movable relay member is in said other end position, whereby said stylus member is caused to produce a recording mark on the chart in a position of the stylus member indicative of said measuring magnitude.

18. A system for indicating a variable measuring magnitude, comprising a differential relay having a movable relay member and two actuating members for producing each a torque on said relay member in opposition to the torque produced by said other actuating member, said movable member having a limited path of motion between two end positions so as to perform a switching-over movement upon a change in the direction of the resultant effect of said opposing torques, an electric contact assembly having two contacts associated with said movable relay member to be operative in said two end positions respectively of said movable relay member, an indicating device having a rotatable arm and an electric indicating element mounted on said arm, drive means for rotating said arm in synchronism with said variations of said opposing magnitude, and a pilot circuit having a current source and an energy storage element connected with said contact assembly and said indicating element so that said storage element is charged from said source when said movable relay member is in one of said end positions and discharged through said indicating element when said movable relay member is in said other end position, whereby said indicating element is caused to effect an indication in a position of its rotary travel indicative of said measuring magnitude.

GEORGE KEINATH.